United States Patent
Otsuka et al.

(10) Patent No.: US 9,291,238 B2
(45) Date of Patent: Mar. 22, 2016

(54) LIQUID EJECTING APPARATUS AND DRIVING METHOD OF LIQUID EJECTING APPARATUS

(71) Applicant: SEIKO EPSON CORPORATION, Tokyo (JP)

(72) Inventors: Shuji Otsuka, Shiojiri (JP); Isao Nomura, Azumino (JP); Hidenori Usuda, Matsumoto (JP); Toru Matsuyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/656,187

(22) Filed: Mar. 12, 2015

(65) Prior Publication Data
US 2015/0258823 A1  Sep. 17, 2015

(30) Foreign Application Priority Data
Mar. 14, 2014  (JP) .................................. 2014-052212

(51) Int. Cl.
*B41J 23/00*  (2006.01)
*B41J 29/38*  (2006.01)
*F16G 1/28*  (2006.01)
*F16G 1/22*  (2006.01)
*B41J 19/20*  (2006.01)

(52) U.S. Cl.
CPC .. *F16G 1/28* (2013.01); *F16G 1/22* (2013.01); *B41J 19/202* (2013.01)

(58) Field of Classification Search
CPC .......... B41J 29/393; B41J 29/02; B41J 29/38; B41J 19/202; B41J 25/34; F16G 1/22
USPC ............................................... 347/14, 19, 37
See application file for complete search history.

(56) References Cited

FOREIGN PATENT DOCUMENTS

JP   2011-046118 A   3/2011

*Primary Examiner* — Jannelle M Lebron
(74) *Attorney, Agent, or Firm* — Maschoff Brennan

(57) ABSTRACT

A liquid ejecting apparatus includes a first pulley; a second pulley; a head unit ejecting a liquid; a carriage in which the head unit is provided; a motor that generates power for driving the carriage; a power supply that supplies the power for ejecting the liquid from the head unit; and a belt that is hung on the first pulley and the second pulley, drives the carriage by the power supplied from the motor, and transmits the power to the head unit, in which the belt includes a first member for electrically connecting the power supply and the head unit, and a second member having an electric resistivity higher than an electric resistivity of the first member.

5 Claims, 11 Drawing Sheets

LIQUID EJECTING APPARATUS AND DRIVING METHOD OF LIQUID EJECTING APPARATUS

The entire disclosure of Japanese Patent Application No. 2014-052212, filed Mar. 14, 2014 is expressly incorporated by reference herein.

BACKGROUND

1. Technical Field

The present invention relates to a liquid ejecting apparatus such as a printer and a driving method of the liquid ejecting apparatus.

2. Related Art

A printer having a configuration in which a driving control section for driving a printer head (hereinafter, referred to as a head) is mounted on a carriage with a head is known. Hereinafter, in such a printer, a portion excluding the carriage and payloads thereof is referred to as "body portion".

In the printer having the configuration described above, since it is necessary to transmit a printing signal from a body portion side to a carriage side, the body portion and the carriage are connected to each other with a flexible flat cable (hereinafter, referred to as FFC) having high bending properties. The FFC is also used to supply power from a power supply unit of the body portion to the driving control section of the carriage.

Here, since the carriage is, for example, a member moving in a main scanning direction, during the movement, the FFC is likely to be a physical hazard on a mechanism. Furthermore, noises are likely to occur in a control signal such as a printing signal through the FFC. Since such problems are present, it is preferable that a technique configuring the liquid ejecting apparatus be used without using the FFC.

From the above circumstances, a liquid ejecting apparatus is proposed in JP-A-2011-46118, in which a timing belt for reciprocating the carriage is configured of a conductive material such as metal and power is supplied to the driving control section of the carriage through the timing belt and pulleys. Furthermore, in the liquid ejecting apparatus proposed in JP-A-2011-46118, a control signal is supplied to the carriage using a wireless communication technique.

However, if the timing belt configured of the conductive material is used, there is a risk of heat generation due to short-circuiting when foreign matter such as ink mist is attached to the timing belt during supply of power. Furthermore, if electrostatic noise occurs due to a discharge phenomenon referred to as Electro Static Discharge (ESD) in the timing belt, power supplied to the carriage is varied and an operation of the driving control section that is an electronic circuit may be affected.

SUMMARY

An advantage of some aspects of the invention is providing a liquid ejecting apparatus in which power can be supplied from a body portion to a carriage without using a FFC and safety is ensured even if foreign matters such as liquid are attached to a member according to supply of power.

According to an aspect of the invention, there is provided a liquid ejecting apparatus including: a first pulley; a second pulley; a head unit ejecting a liquid; a carriage in which the head unit is provided; a motor that generates power for driving the carriage; a power supply that supplies the power for ejecting the liquid from the head unit; and a belt that is hung on the first pulley and the second pulley, drives the carriage by the power supplied from the motor, and transmits the power to the head unit. The belt includes a first member for electrically connecting the power supply and the head unit, and a second member having an electric resistivity higher than an electric resistivity of the first member.

In this case, since the belt includes a conductive member (first member) suitable for transmission, it is possible to supply the power to the head unit using the belt and a FFC of the related art that is used for power supply is not required. Furthermore, a risk of short-circuit and the like due to attachment of foreign matters and the like is greatly reduced compared with a case where an entire belt is configured of the conductive material. That is, safety is ensured as long as the foreign matters such as ink mist are not attached to the first member. Furthermore, if the entire belt is configured of the conductive material, it is not possible to use a non-conductive material even if the material has high strength, but according to the embodiment, it is possible to reinforce the strength of the belt using the non-conductive material.

In the liquid ejecting apparatus, an area occupied by the first member of a surface area of the belt may be smaller than an area occupied by the second member.

In this case, since a ratio occupied by the second member, which is relatively safe even if the foreign matters such as ink mist are attached, of the surface area of the belt is greater than the area occupied by the first member, a risk of electric leakage or attachment of the foreign matters is further reduced.

In the liquid ejecting apparatus, the power may be transmitted to the belt through the first pulley. A power transmission groove section for transmitting the power from the first pulley may be formed on the second member. A power transmission projection section for transmitting the power to the power transmission groove section may be formed on the first pulley.

In this case, the power by the motor is transmitted to the belt through the first pulley. Specifically, the power is transmitted to the belt by the power transmission projection section formed on the first pulley and the power transmission groove section formed on the belt. Here, since the power transmission groove section is formed on the second member of the belt which is not used for supplying the power, it is possible to suppress influence of noise according to ESD generated by friction between the first pulley and the belt applying to the supplied power. Moreover, it is preferable that the power transmission projection section and the power transmission groove section be insulated from a supply path of a potential from the first pulley side to the belt side.

In the liquid ejecting apparatus, the power may be transmitted to the belt through at least one of the first pulley and the second pulley. A belt-side engagement section to which the power is transmitted from at least one of the first pulley and the second pulley may be formed on the first member. A pulley-side engagement section that transmits the power to the belt-side engagement section may be formed on at least one of the first pulley and the second pulley.

In this case, since the power is transmitted from the pulley side to the belt side by the belt-side engagement section and the pulley-side engagement section engaged with each other, for example, cutoff of the transmission of the power due to shift of the timing belt on an outer peripheral surface of the pulley in a thickness direction of the pulley is prevented.

In the liquid ejecting apparatus, the first member, the second member, the first pulley, and the second pulley may be made of a material having characteristics of charging with the same polarity.

In this case, even if the first member, the second member, the first pulley, and the second pulley are charged by friction and the like, because of being charged with the same polarity, the noise according to the ESD is reduced and stability of the potential supplying from the pulley to the belt is improved.

According to another aspect of the invention, there is provided a driving method of a liquid ejecting apparatus including a first pulley; a second pulley; a head unit ejecting a liquid; a carriage in which the head unit is provided; a motor that generates power for driving the carriage; a power supply that supplies power for ejecting the liquid from the head unit; and a belt that includes a first member for electrically connecting the power supply and the head unit and a second member having an electric resistivity higher than an electric resistivity of the first member, is hung on the first pulley and the second pulley, and drives the carriage by the power supplied from the motor, the method including: supplying the power to the head unit through the first member; and ejecting liquid droplets by the head unit to which the power is supplied.

In this case, since the belt includes a conductive member (first member) suitable for transmission, it is possible to supply the power to the head unit using the belt and a FFC of the related art that is used for power supply is not required. Furthermore, a risk of short-circuit and the like due to attachment of foreign matters and the like is greatly reduced compared with a case where an entire belt is configured of the conductive member. That is, safety is ensured as long as the foreign matters such as ink mist are not attached to the first member. Furthermore, if the entire belt is configured of the conductive material, it is not possible to use a non-conductive material even if the material has a high strength, but according to the embodiment, it is possible to reinforce the strength of the belt using the non-conductive material.

Moreover, a liquid ejecting apparatus according to the invention further includes the following embodiments.

According to still another aspect of the invention, there is provided a liquid ejecting apparatus including a first pulley; a second pulley; a belt that is hung on the first pulley and the second pulley, a carriage in which a head unit ejecting liquid droplets is provided and which is connected to the belt; and a power supply that outputs a first power supply signal of which a level is a first potential. The belt includes a first member to which the first power supply signal is supplied and which is electrically connected to the head unit, and a second member having an electric resistivity higher than an electric resistivity of the first member.

In this case, since the belt includes a conductive member (first member) suitable for transmission, it is possible to supply the power to the head unit using the belt and a FFC of the related art that is used for power supply is not required. Furthermore, a risk of short-circuit and the like due to attachment of foreign matters and the like is greatly reduced compared with a case where an entire belt is configured of the conductive member. That is, safety is ensured as long as the foreign matters such as ink mist are not attached to the first member. Furthermore, if the entire belt is configured of the conductive material, it is not possible to use a non-conductive material even if the material has a high strength, but according to the embodiment, it is possible to reinforce the strength of the belt using the non-conductive material.

In the liquid ejecting apparatus, an area occupied by the first member of a surface area of the belt may be smaller than an area occupied by the second member.

In this case, since the area occupied by the second member, which is relatively safe even if the foreign matters such as ink mist are attached, of the surface area of the belt is greater than the area occupied by the first member, a risk of electric leakage or attachment of the foreign matters is further reduced.

In the liquid ejecting apparatus, a conductive section for supplying the first power supply signal and a power transmission projection section protruding to the belt may be formed on an outer peripheral surface of at least one of the first pulley and the second pulley. A power transmission groove section meshing with the power transmission projection section may be formed on a surface of the belt coming into contact with the outer peripheral surface. The power transmission projection section and the conductive section may be provided in a different region of the outer peripheral surface.

In this case, since a portion according to supply of a predetermined potential separately from (in a different region from) a portion according to the power transmission is provided in the pulley and the belt, influence of noise applying to the supplied potential according to ESD generated by friction between the pulley and the belt is reduced in the supply of a predetermined potential. Moreover, it is preferable that the power transmission projection section and power transmission groove section that are tooth-shaped sections be insulated from a supply path of the potential from the pulley side to the belt side.

In the liquid ejecting apparatus, one of the first member and the conductive section may be formed in a protrusion member protruding toward the other side. The other side of the first member and the conductive section is formed in an engagement member engaging with the protrusion member.

In this case, since the belt and the pulley include portions engaging with each other, shift of the timing belt in the thickness direction of the pulley on the outer peripheral surface of the pulley is prevented.

In the liquid ejecting apparatus, the first member, the second member, the first pulley, and the second pulley may be made of a material having characteristics of charging with the same polarity.

In this case, even if the first member, the second member, the first pulley, and the second pulley are charged by friction and the like, because of being charged with the same polarity, the noise according to the ESD is reduced and stability of the potential supplying from the pulley to the belt is improved.

The liquid ejecting apparatus may further include a support section that movably supports the carriage. The power supply may output a second power supply signal of which a level is a second potential, the second power supply signal may be supplied to the support section, and the second power supply signal may be supplied from the support section to the head unit through the carriage.

In this case, the second power supply signal is supplied from the support section supporting the carriage to the head unit. Thus, since it is not necessary to newly provide a member for supplying the second power supply signal to the head unit, a further simple configuration is realized. Here, "second power supply signal is supplied" is a concept that includes an aspect that the support section and a housing are electrically connected to each other through a fixing member for fixing the support section to the housing. In this case, the second power supply signal that is a potential of the housing is supplied to the support section through a path of the housing→the fixing member→the support section.

The liquid ejecting apparatus may include the housing to which the second power supply signal is supplied. In this case, a discharging path to be discharged from the head unit to the housing through the support section and the fixing member is realized.

According to still another aspect of the invention, there is provided a driving method of a liquid ejecting apparatus including a first pulley; a second pulley; a belt that is hung on the first pulley and the second pulley, and includes a first member and a second member having an electric resistivity higher than an electric resistivity of the first member; a carriage that includes a head unit ejecting liquid droplets and is fixed to the belt; and a power supply that outputs the first power supply signal of which a level is a first potential and a second power supply signal of which a level is a second potential, the method including: supplying the second power supply signal to the head unit and supplying the first power supply signal to the head unit through the first member of the belt; and ejecting liquid droplets by the head unit to which the power is supplied by the first power supply signal and the second power supply signal.

In this case, since the belt includes a conductive member (first member) suitable for transmission, it is possible to supply the power to the head unit using the belt and a FFC of the related art that is used for power supply is not required. Furthermore, a risk of short-circuit and the like due to attachment of foreign matters and the like is greatly reduced compared with a case where an entire belt is configured of the conductive member. That is, safety is ensured as long as the foreign matters such as ink mist are not attached to the first member. Furthermore, if the entire belt is configured of the conductive material, it is not possible to use a non-conductive material even if the material has a high strength, but according to the embodiment, it is possible to reinforce the strength of the belt using the non-conductive material.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. Meanwhile, in each drawing, dimensions and scales of each section are appropriately different from those of actuality. Furthermore, since the embodiments described below are preferred embodiments of the invention, technically preferred various limitations are added thereto, but the scope of the invention is not limited to the aspects unless there is a particular description to limit the invention in the following description.

First Embodiment

Hereinafter, as a liquid ejecting apparatus according to the embodiment, a serial type ink jet printer (hereinafter, referred to as a printer) is described as an example.

Figure 1:
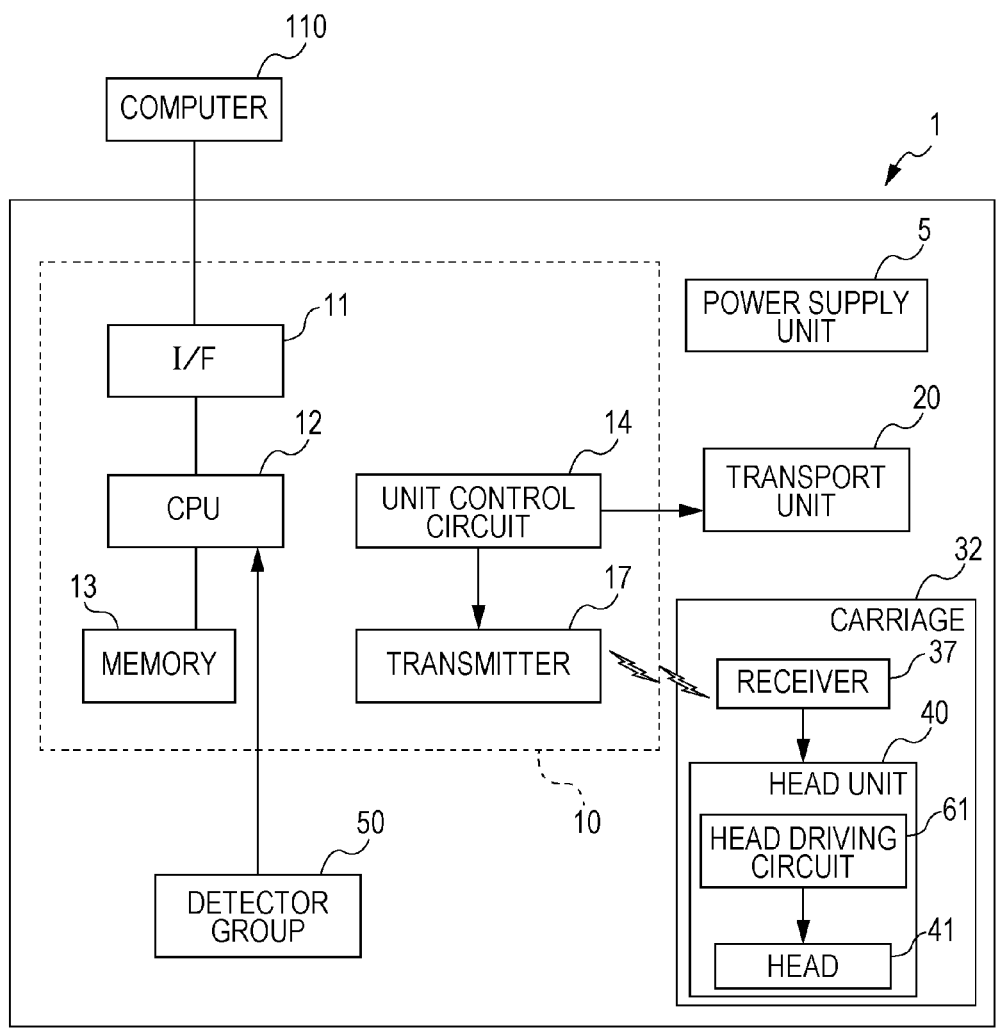
FIG. 1 is a block diagram illustrating a system configuration of a printer.
Figure 2:
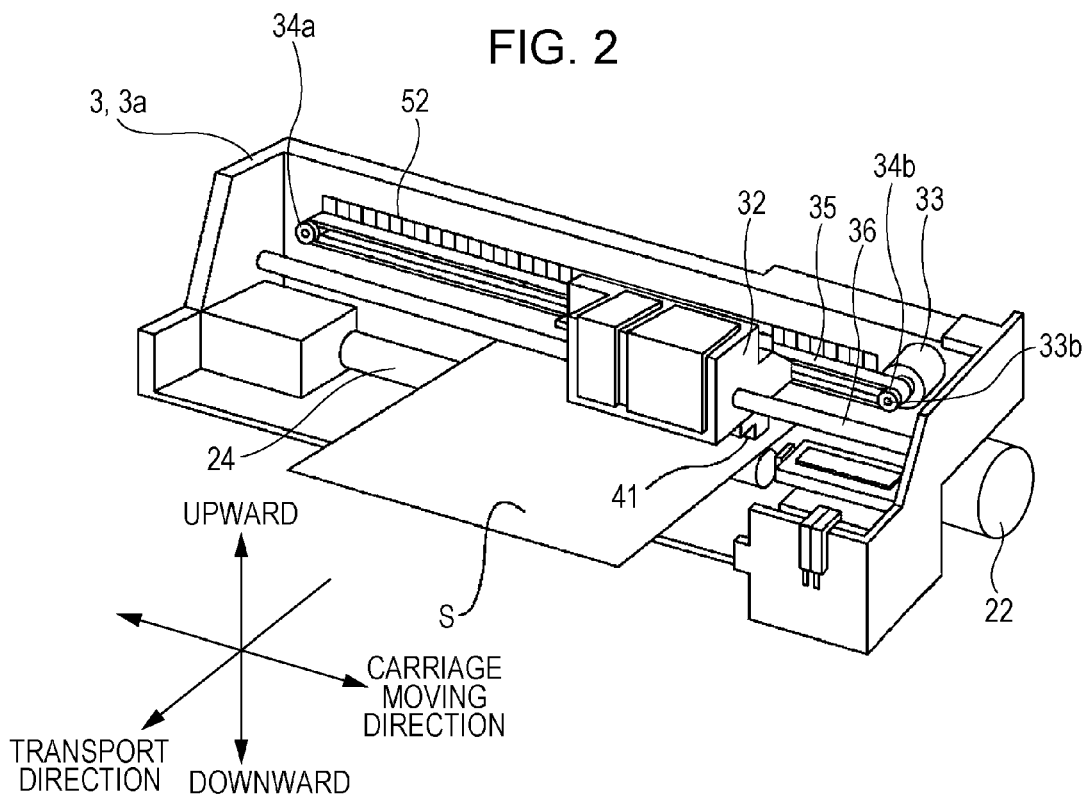
FIG. 2 is a perspective view illustrating an internal configuration of the printer.
Figure 3:
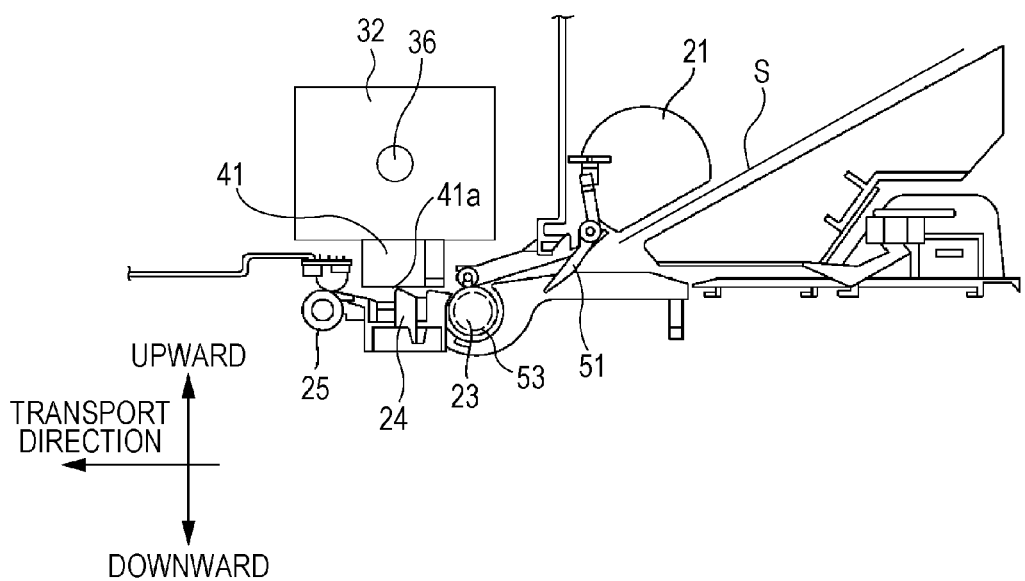
FIG. 3 is a side cross-sectional view of the printer illustrated in FIG. 2.

FIG. 1 is a block diagram illustrating a system configuration of a printer 1. FIG. 2 is a perspective view illustrating an internal configuration of the printer 1. FIG. 3 is a side cross-sectional view of the printer illustrated in FIG. 2.

As illustrated in FIG. 1, the printer 1 is used by connecting to a computer 110 that is an external device. That is, if the printer 1 receives printing data transmitted from the computer 110, each section is controlled by a controller 10 and an image is formed on a recording sheet (hereinafter, referred to as a sheet) S. At this time, situations inside the printer 1 are monitored by a detector group 50 and the controller 10 controls each section based on a detection result thereof.

A housing 3 includes a box that houses each configuration member and a mechanical frame 3a made of a conductive material such as metal provided on the inside thereof.

A power supply unit 5 is fixed to the housing 3. The power supply unit 5 is connected to a household AC power outlet and the like through an electric code and the like, and thereby the power supply unit 5 functions as a DC power supply of 42 V and the like and supplies the power to each section. The power supply unit 5 is provided with a positive terminal of 42 V as an output terminal for power supply and a ground terminal that is electrically grounded through the mechanical frame 3a.

Moreover, the output terminal included in the power supply unit 5 may not necessarily be the positive terminal and may be a negative terminal that outputs the power supply signal of which a level is a negative potential. That is, the power supply unit 5 may include the output terminal outputting a first power supply signal of which a level is a predetermined potential and a second power supply signal of which a level is a reference potential (for example, ground (GND) level). That is, the power supply unit 5 functions as a power supply that supplies the power for ejecting the liquid from nozzles of a head unit 40.

In the embodiment, since a piezoelectric element is used for ejecting the liquid (ink droplets) from the nozzles of the head unit 40 and the piezoelectric element is displaced by the charging and discharging, a power supply path to the head unit 40 (head driving circuit 61) is a charging path to the piezoelectric element.

Since the power is calculated by a product of a voltage and a current (power P [W]=voltage E [V]·current I [A]), in order to transmit the power, a power supply path through which the current flows from the power supply generating the power to a load and a discharging path through which the current returns from the load to the power supply are necessary. That is, the power supply is electrically connected to the load through the power supply path and the discharging path, and the power supply applies a power supply voltage to the power supply path and the discharging path. More specifically, the first power supply signal is supplied to the power supply path and the second power supply signal is supplied to the discharging path, and thereby the power supply voltage applied by a potential difference between the first power supply signal and the second power supply signal is applied to the power supply path and the discharging path.

In the embodiment, "the power is supplied" is a concept that includes the power supply voltage being applied to the power supply path and the discharging path, and the power supply signal being supplied to at least one of the power supply path and the discharging path.

The controller 10 is also fixed to the housing 3. Then, the controller 10 has an interface section 11, a CPU 12, a memory 13, a unit control circuit 14, and a transmitter 17. The interface section 11 performs transmitting and receiving of data between the computer 110 and the printer 1. The CPU 12 is an operation processing device performing control an entirety of the printer 1 and controls each section through the unit control circuit 14. The memory 13 secures a region for storing a program of the CPU 12 or a working region and the like. The transmitter 17 wirelessly transmits a various signals such as a printing signal PRT described below.

A transport unit 20 feeds the sheet S to a printable position, transports the sheet S by a predetermined transport amount in a transport direction during printing, and, as illustrated in FIGS. 2 and 3, has a feeding roller 21, a transport motor 22, a transport roller 23, a platen 24, and a discharging roller 25. The feeding roller 21 delivers the sheet S to be printed to a position of the transport roller 23.

Then, if a sheet detection sensor 51 that is one of the detector group 50 illustrated in FIG. 1 detects a leading end of the sheet S delivered to the transport roller 23, the controller 10 rotates the transport roller 23 and positions the sheet S at a printing start position.

When the sheet S is positioned at the printing start position, at least one of nozzles of a lower surface 41a of a head 41 faces the sheet S. The platen 24 is provided at a position capable of facing the lower surface 41a of the head 41 and supports the sheet S from below during printing.

A carriage 32 is provided with the head unit 40 and a receiver 37.

The carriage 32 is supported and guided by a guide rail 36 fixed to the housing 3, and reciprocates in a direction (moving direction of the carriage) intersecting the transport direction illustrated in FIG. 2. Specifically, the carriage 32 has a carriage motor 33 provided in the housing 3 as a driving source, to which a part of a timing belt 35 is fixed (connected), and is moved by the delivery of the timing belt 35.

The guide rail 36 that functions as a support section of the carriage 32 is, for example, a subsequently columnar member (shaft) of which a longitudinal direction (axial direction) is the moving direction of the carriage 32. Here, a through hole penetrating in the moving direction is formed in the carriage 32 and the guide rail 36 is inserted into the through hole.

As described below, the guide rail 36 is electrically connected to a ground terminal 62G of the head driving circuit 61 and is used as a so-called discharging path. The guide rail 36 is electrically connected to the housing 3 (the mechanical frame 3a) and is set to be the reference potential (for example, a potential of a GND level). In other words, the second power supply signal of which the level is the reference potential is supplied to the guide rail 36. Here, "second power supply signal is supplied to the guide rail 36" is a concept including an aspect that the guide rail 36 and the housing 3 (mechanical frame 3a) are electrically connected to each other through a fixing member (not illustrated) fixing the guide rail 36 to the housing 3 (mechanical frame 3a). In this case, the second power supply signal that is a potential of the housing 3 (mechanical frame 3a) is supplied to the guide rail 36 through a path of the housing 3 (mechanical frame 3a)→the fixing member (not illustrated)→the guide rail 36.

Moreover, in the embodiment, the power is supplied to the head unit 40 through the timing belt 35 and the guide rail 36 is used in the discharging path through which the returning current flows, but the timing belt 35 may also be used as the discharging path. That is, the timing belt 35 may function as a second path of the power supply path and the discharging path.

As illustrated in FIG. 2, the timing belt 35 is hung on (passed over) a first pulley 34a and a second pulley 34b, and the driving force of the carriage motor 33 is transmitted and fed to the timing belt 35 therethrough.

Here, since a part of the timing belt 35 is fixed to the carriage 32, if the second pulley 34b is driven to rotate and the timing belt 35 is fed by the carriage motor 33, the carriage 32 is moved in the moving direction of the carriage. That is, the head 41 is moved with respect to the sheet S in the moving direction of the carriage.

The receiver 37 receives a signal wirelessly transmitted from the transmitter 17 of the controller 10 and supplies the head driving circuit 61 of the head unit 40. Specifically, the signal received by the receiver 37 is, for example, a control signal for driving the head 41 such as the printing signal PRT or an original signal generation parameter (described below).

The head unit 40 is mounted on the carriage 32. Then, the head unit 40 has the head 41 for ejecting the ink droplets on the sheet S and the head driving circuit 61 (see FIG. 5) that drives the head 41 to eject the ink droplets from the nozzles of the head 41. A plurality of nozzles are provided on the lower surface 41a of the head 41 and each nozzle is provided with an ink chamber in which the ink is stored and the piezoelectric element as a driving device for ejecting the ink droplets by changing a volume of an ink chamber. Then, the head driving circuit 61 ejects the ink droplets by driving piezoelectric element based on the printing signal PRT and the like.

The detector group 50 includes a linear type encoder 52 (see FIG. 2) or a rotary type encoder 53 (see FIG. 3), and the like. The linear type encoder 52 detects a position of the carriage 32. The rotary type encoder 53 detects a rotational amount of the transport roller 23.

The printer 1 having such a configuration intermittently ejects the ink droplets from the head 41 moving along the moving direction of the carriage and alternately repeats a dot forming operation for forming dots on the sheet S and a transport operation for transporting the sheet S in the transport direction. Then, a dot column is formed at a position in which the transport direction is different from that of a dot column (raster line) formed by the previous dot forming operation and thereby an image is completed on the sheet S.

Moreover, the printer 1 can also perform bi-directional printing, that is, the image can also be formed by ejecting the ink droplets on the sheet S in a forward path and a returning path in the moving direction of the carriage. In this case, the transport operation of the sheet S is performed during the dot forming operation of the forward path and the returning path.

Figure 4:
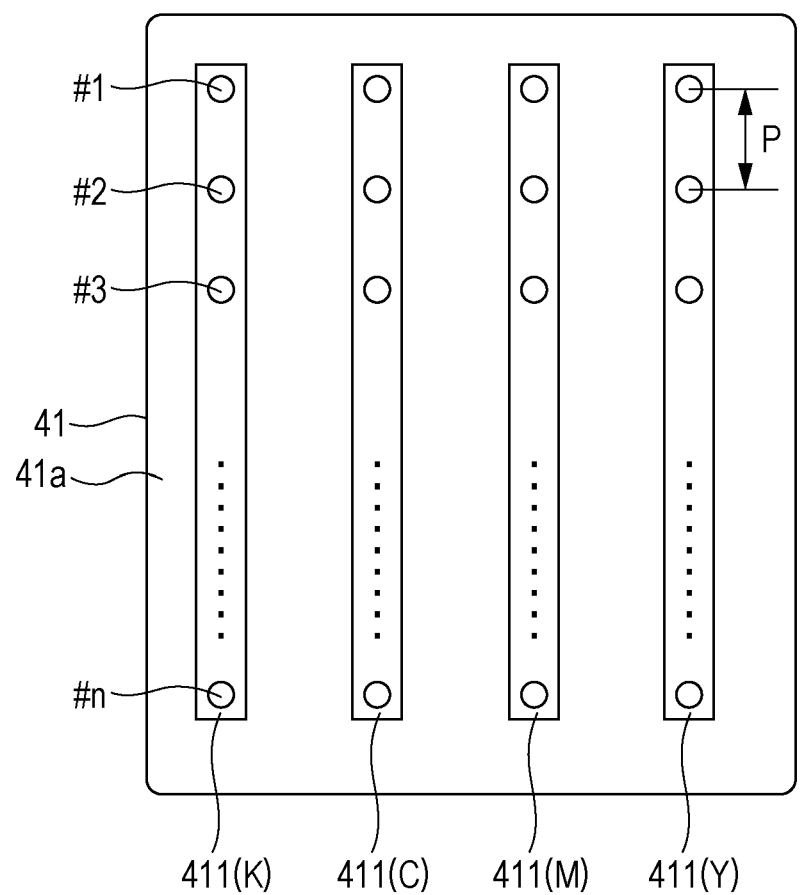
FIG. 4 is a view illustrating an arrangement of nozzles in a head.
Figure 4:
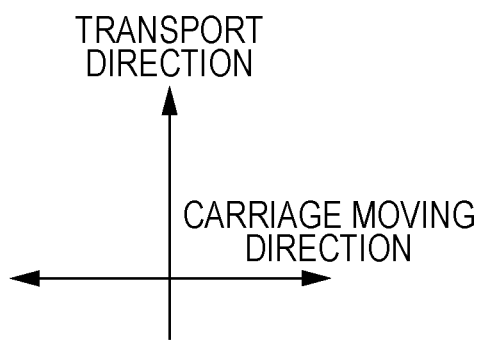

FIG. 4 is a view illustrating an arrangement of nozzles in the head 41. The lower surface 41a of the head 41 is provided with a nozzle column 411 including a plurality (for example, 180) of nozzle #1 to #n respectively for each color of black (K), cyan (C), magenta (M), and yellow (Y). The nozzles #1 to #n included in the nozzle column 411 are linearly arranged at a predetermined nozzle pitch P (for example, 180 dpi) along the transport direction of the sheet S. Furthermore, the nozzle columns 411 are arranged at intervals in the moving direction of the carriage in parallel with each other.

Figure 5:
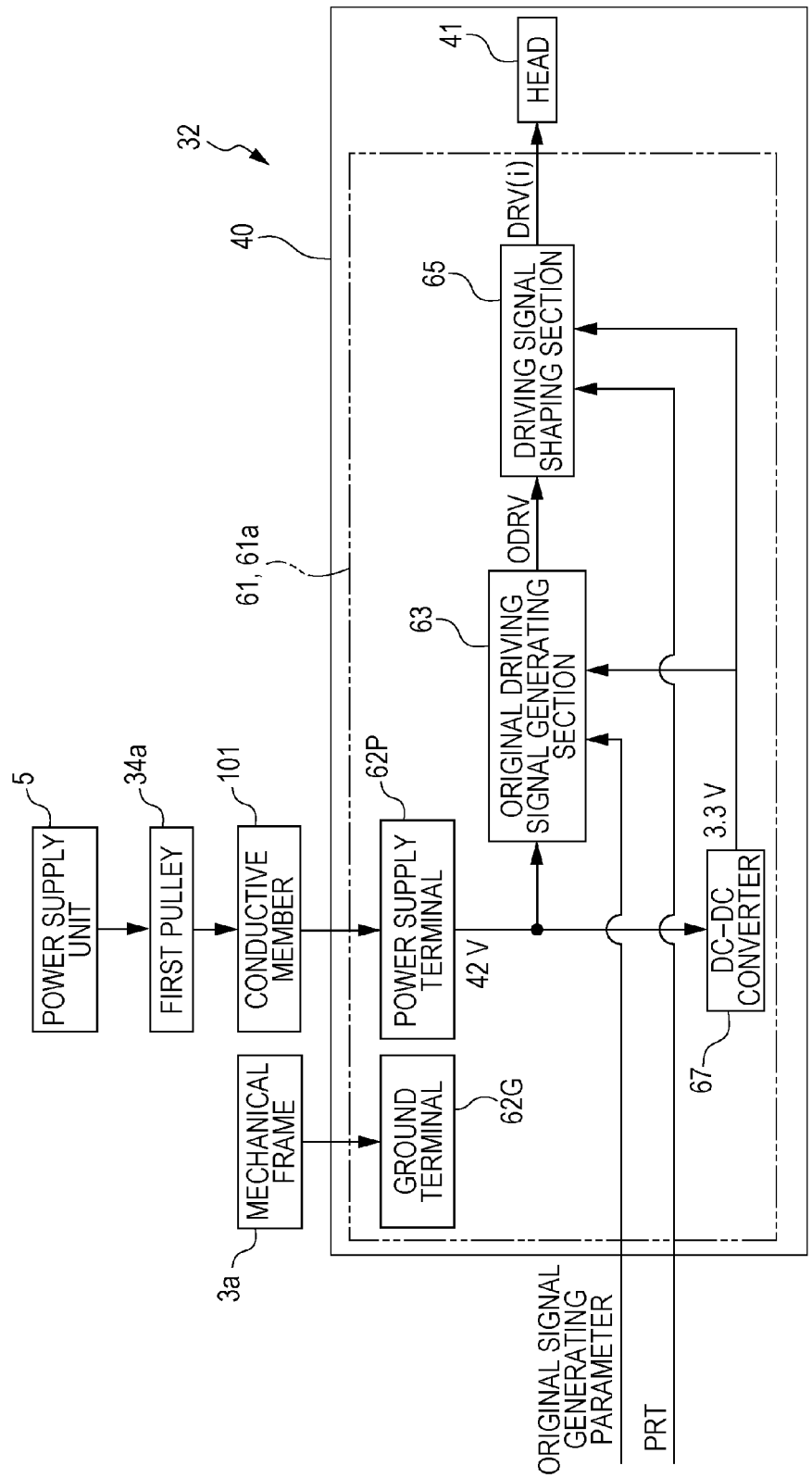
FIG. 5 is an explanatory view of a head driving circuit included in a head unit.

FIG. 5 is an explanatory view of the head driving circuit 61 included in the head unit 40. In the drawing, a member surrounded by a two-dotted chain line is a member included in the head driving circuit 61. For example, the head driving circuit 61 is a circuit substrate 61a that is driven to control each section of the head unit 40, is disposed inside the carriage 32, and includes an original driving signal generating section 63 and a driving signal shaping section 65. Moreover, both are configured of, for example, electric circuits.

The head driving circuit 61 is provided for each nozzle column 411, that is, for each nozzle column 411 of each color of black (K), cyan (C), magenta (M), and yellow (Y). Furthermore, the driving of the piezoelectric element is performed for each nozzle. In the drawing, a number in a parentheses attached to an end of each signal name indicates the number of nozzle to which the signal is supplied.

If a voltage of a predetermined time width is applied between electrodes provided both ends of the piezoelectric element, the piezoelectric element included in each nozzle is expanded in response to an applied time of the voltage and deforms a side wall of the flow path of the ink. Thus, a volume of the flow path of the ink is contracted according to the expansion and contraction of the piezoelectric element and an ink amount corresponding to the contracted volume becomes ink droplets and is ejected from each of the nozzles #1 to #180 of each color.

As illustrated in FIG. 5, the first pulley 34a and the timing belt 35 also function as a power supply system for supplying the power to the head driving circuit 61 (see FIG. 5) mounted on the carriage 32. Detailed configurations or the like of these members will be described later.

Figure 6:
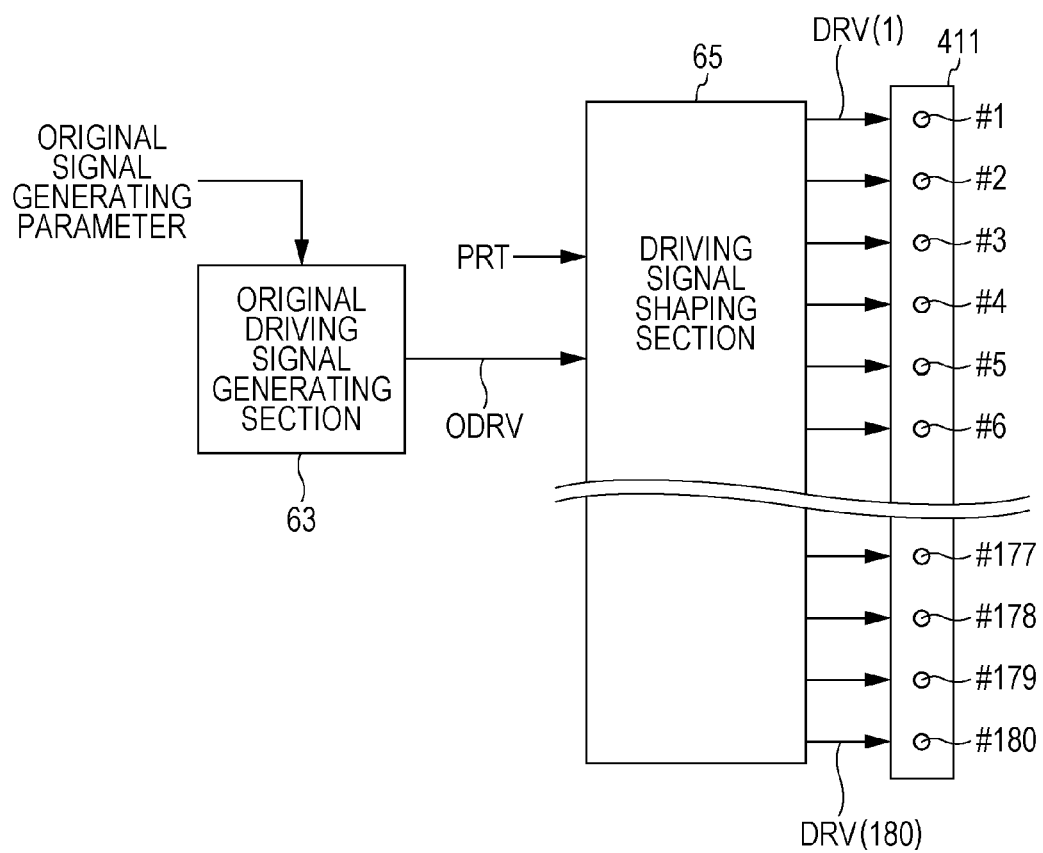
FIG. 6 is a view illustrating an input-output relationship of an original driving signal generating section.
Figure 7:
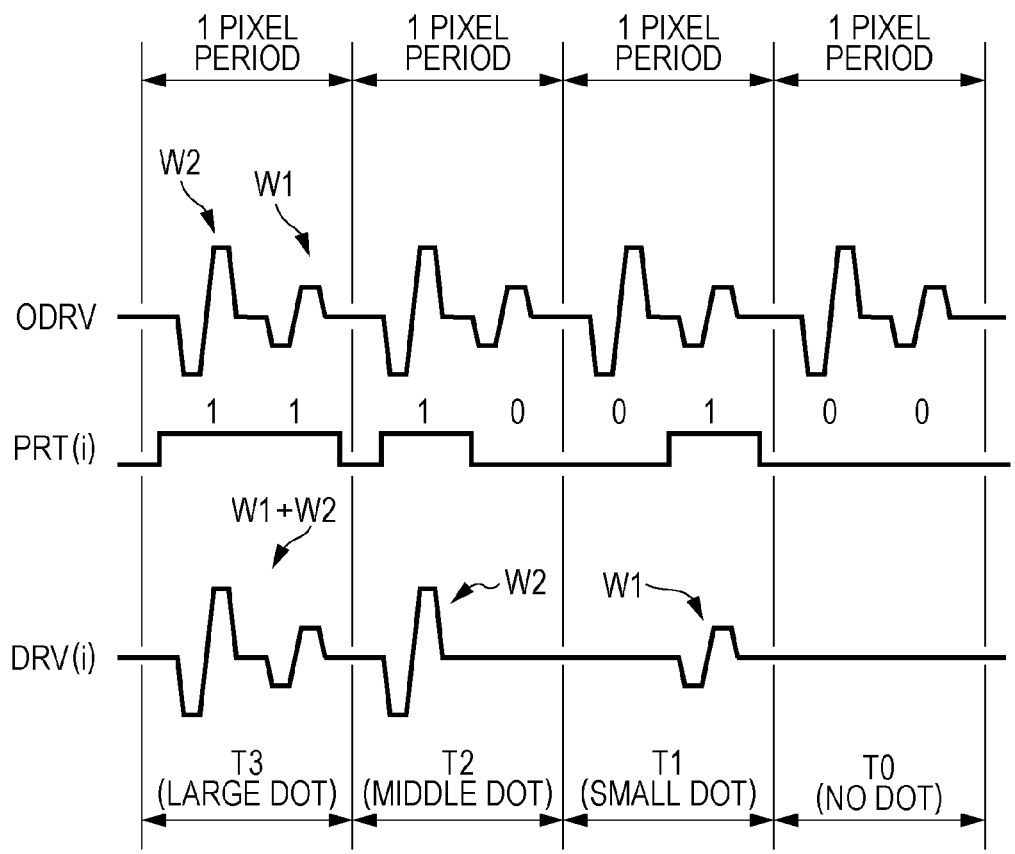
FIG. 7 is a view illustrating an example of waveforms of an original signal ODRV, a printing signal PRT(i), and a driving signal DRV(i).

As illustrated in FIG. 6, the original signal generation parameter defining a waveform shape and the like of an original signal ODRV is input into the original driving signal generating section 63. The original driving signal generating section 63 generates the original signal ODRV that is commonly used for each of the nozzles #1 to #n based on the original signal generation parameter. Here, as illustrated in FIG. 7, the original signal ODRV is a signal including two pulses of a first pulse W1 and a second pulse W2 within one pixel period (within a time when the carriage 32 traverses an interval of one pixel).

Meanwhile, as illustrated in FIG. 6, the original signal ODRV is input from the original driving signal generating section 63 into the driving signal shaping section 65 and the printing signal PRT based on the printing data is input into the driving signal shaping section 65. The printing signal PRT is a signal corresponding to pixel data assigned for one pixel. That is, the printing signal PRT is a signal corresponding to the pixel data included in the printing data.

The driving signal shaping section 65 cuts off or passes the original signal ODRV for each nozzle (i) based on the printing signal PRT(i) corresponding to each nozzle (i). For example, as illustrated in FIG. 7, if the printing signal PRT(i) is a 2-bit signal and is "00", both pulses W1 and W2 of the original signal ODRV are cut off, if the printing signal PRT(i) is the same and is "01", only the pulse W1 is cut off and the pulse W2 is passed through, if the printing signal PRT(i) is the same and is "10", only the pulse W2 is cut off and the pulse W1 is passed through, and if the printing signal PRT(i) is the same and is "11", both pulses W1 and W2 are passed through.

Then, the driving signal shaping section 65 outputs the pulse that is passed through to the piezoelectric element of each nozzle (i) as a driving signal DRV(i). The piezoelectric element of each nozzle (i) performs ejection of the ink droplets by being driven based on the driving signal DRV(i) from the driving signal shaping section 65.

Hereinafter, the power supply system to the head driving circuit 61 will be described. For example, the head driving circuit 61 is configured of an electric circuit and is operated by supplied power.

The circuit substrate of the head driving circuit 61 is provided in the carriage 32. In the printer of the related art, the power supply unit on the body portion side and the circuit substrate on the carriage side are connected by the FFC and the power is supplied from the power supply unit to the circuit substrate 61a through the FFC. Moreover, in the printer of the related art, the FFC also supplies the control signal in addition to the power from the body portion side (controller) to the carriage side (head driving circuit).

Meanwhile, in the printer 1 of the embodiment, in an aspect described below, the power is supplied from the body portion side (power supply unit 5) to the carriage 32 side (head driving circuit 61) without using the FFC.

Figure 8:
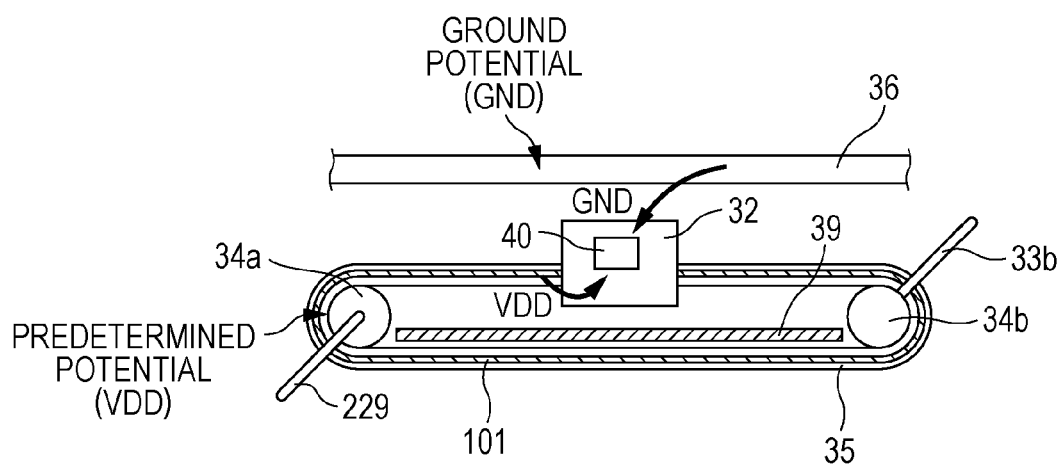
FIG. 8 is a schematic view illustrating an aspect of power supply from a body portion side (power supply unit) to a carriage side (head driving circuit).
Figure 9:
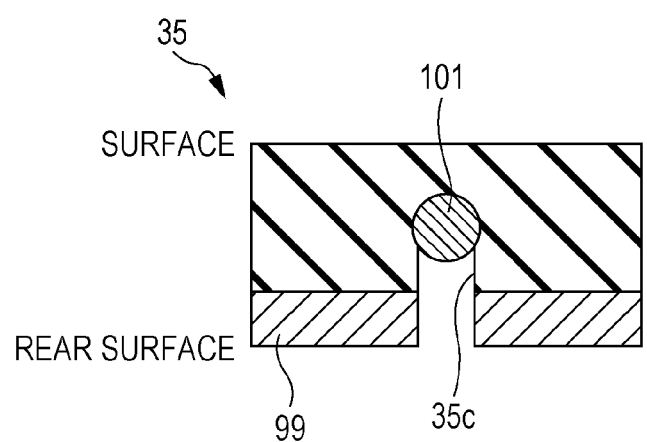
FIG. 9 is a cross-sectional view of a timing belt.
Figure 10:
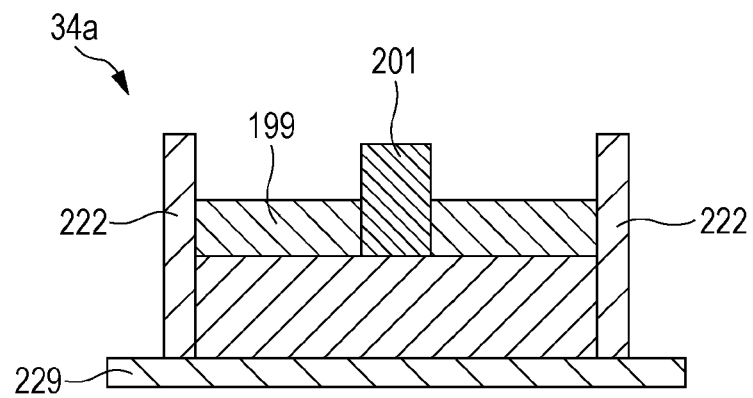
FIG. 10 is a view illustrating a part of a cross section that is obtained by cutting a first pulley in a radial direction.
Figure 11:
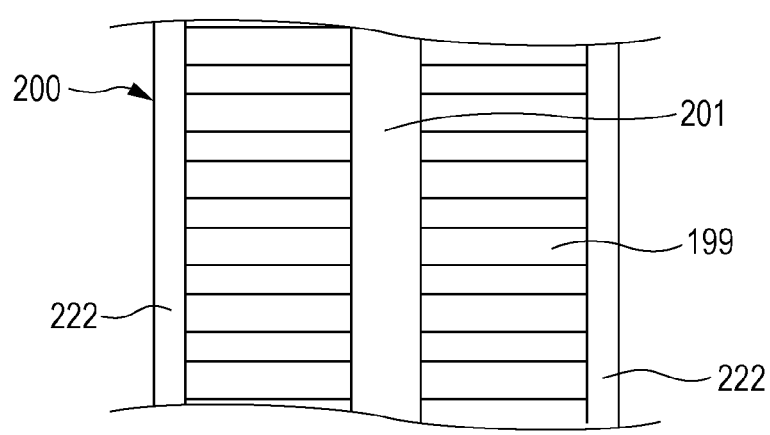
FIG. 11 is a view illustrating an aspect of an outer peripheral surface of the first pulley.

FIG. 8 is a schematic view illustrating an aspect of power supply from the body portion side (power supply unit 5) to the carriage 32 side (head driving circuit 61). FIG. 9 is a cross-sectional view of the timing belt 35 that is taken in a thickness direction. FIG. 10 is a schematic cross-sectional view illustrating a part (one side of a shaft member 229 as a boundary) of a cross section of the first pulley 34a, which is taken along a plane including a central axis of rotation. In other words, FIG. 10 is a view illustrating a part (one side of the shaft member 229 as a boundary) of a cross section of the first pulley 34a, which is taken along a radial direction. FIG. 11 is a view illustrating an aspect of an outer peripheral surface 200 of the first pulley 34a.

In the printer 1 of the embodiment, the first pulley 34a and the timing belt 35 according to the movement of the carriage 32 also serve as the power supply system to the head driving circuit 61. Moreover, it is preferable that the second pulley 34b be formed of a non-conductive material.

As illustrated in FIGS. 2 and 8, one pulley (first pulley 34a in the example) is provided at one end of a reciprocating path of the carriage 32. The other pulley (second pulley 34b in the example) is concentrically fixed to a driving rotation shaft 33b of the carriage motor 33 provided at the other end of the reciprocating path.

Moreover, in the example, for convenience of description, the second pulley 34b is fixed to the driving rotation shaft 33b of the carriage motor 33, but, of course, the first pulley 34a may be fixed to the driving rotation shaft 33b of the carriage motor 33. Furthermore, both the first pulley 34a and the second pulley 34b are respectively provided with each carriage motor 33 and are fixed to each driving rotation shaft 33b. Thus, the carriage motor 33 that is operated may be appropriately switched so as to drive any one pulley.

The endless timing belt 35 is wound around a pair of pulleys 34a and 34b, and the carriage 32 is connected (fixed) to a part of the timing belt 35 through a connection section. The connection section is, for example, a pair of gripping members fixed to the carriage 32 side and the gripping members clamp a part of the timing belt 35, and thereby the timing belt 35 and the carriage 32 are physically connected to be relatively immovable. Thus, a driving force of the carriage motor 33 is transmitted to the carriage 32 through the timing belt 35 and thereby the carriage 32 is reciprocated.

As illustrated in FIGS. 8 and 9, the timing belt 35 is an electroconductive member (hereinafter, referred to as conductive member) 101. The timing belt 35 itself is made of a material having an electric resistivity (for example, non-conductive or insulating) higher than an electric resistivity of the conductive member 101. Specifically, the timing belt 35 is made of a material having substantially no risk of short-circuit even if the liquid such as the ink is attached. The conductive member 101 is a wire-shaped member made of a material having an appropriate electric resistivity for the power supply and, specifically, may be wire-shaped metal (for example, steel and the like).

That is, the conductive member 101 functions as a first member supplying the power (first power supply signal) output from the power supply unit 5 in the timing belt 35 to the head unit 40. Furthermore, the timing belt 35 itself functions as a second member having the electric resistivity higher than the electric resistivity of the first member (conductive member 101).

The conductive member 101 is disposed (embedded) in the timing belt 35 along the longitudinal direction on the inside thereof and a cutout section 35c is formed such that at least a part of the conductive member 101 is exposed to the outside. Furthermore, the timing belt 35 has a tooth-shaped section 99 (power transmission groove section) meshing with tooth-shaped sections 199 (power transmission projection section) formed on the outer peripheral surfaces of the first pulley 34a and the second pulley 34b.

As illustrated in FIG. 9, the cutout section 35c is formed on a rear surface (surface coming into contact with the first pulley 34a and the second pulley 34b) of the timing belt 35. Thus, it is possible to suppress attachment of foreign matters to the conductive member 101 through the cutout section 35c.

Moreover, in order to further reliably prevent the attachment of foreign matters to the conductive member 101 through the cutout section 35c, of course, a cover member 39 (see FIG. 8) covering the rear surface of the timing belt 35 may be provided.

As described above, it is possible to supply power using the timing belt 35 and to greatly enhance safety by configuring the timing belt 35 compared with a case where an entirety of the timing belt 35 is configured of the conductive material. Here, in an area that is a sum of an area (hereinafter, referred to as a conductive exposed area) of a portion of the conductive member 101, which is exposed to the outside and an area (hereinafter, referred to as a non-conductive exposed area) of a portion of the timing belt 35, which is exposed to the outside, it is preferable that a ratio occupied by the conductive exposed area be smaller than a ratio occupied by the non-conductive exposed area. Thus, a risk of electric leakage from the conductive member 101 or attachment of the foreign matters to the conductive member 101 is further reduced.

As illustrated in FIG. 11, the outer peripheral surface 200 of the first pulley 34a coming into contact with the timing belt 35 has a conductive protrusion section 201 (conductive section) that is inserted into the cutout section 35c of the timing belt 35 and comes into contact with the conductive member 101, and the tooth-shaped section 199 (protrusion section) to which the power is transmitted from the timing belt 35. The outer peripheral surface 200 and the conductive protrusion section 201 of the first pulley 34a are formed of a conductive material such as metal. The conductive protrusion section 201 is a protrusion section that is convex in a direction perpendicular to the outer peripheral surface 200 of the first pulley 34a. As described above, the outer peripheral surface 200 of the first pulley 34a has the conductive protrusion section 201 and the tooth-shaped section 199 independently of each other, in which the conductive protrusion section 201 is the conductive section that is used for supplying the potential and the tooth-shaped section 199 is the protrusion section that is used for transmitting the power.

Here, the conductive protrusion section 201 of the first pulley 34a is electrically connected to the positive terminal of the power supply unit 5 described above. Specifically, for example, a brush member (not illustrated) that is electrically connected to the positive terminal of the power supply unit 5 comes into sliding contact with the outer peripheral surface 200 of the first pulley 34a having conductivity. The power (first power supply signal) is supplied from the positive terminal of the power supply unit 5 to the conductive protrusion section 201 through the outer peripheral surface 200.

Moreover, if a portion of the first pulley 34a from the shaft member 229 to the conductive protrusion section 201 is formed of a material having the conductivity, for example, the power (first power supply signal) may be supplied from the power supply unit 5 to the conductive protrusion section 201 through the shaft member 229.

In addition, a power supply terminal 62P (for example, a positive terminal) of the circuit substrate 61a of the head driving circuit 61 in FIG. 5 is extended to a connection portion of the carriage 32 and the timing belt 35, and is electrically connected to the conductive member 101 so as to come into contact with the conductive member 101 inside the timing belt 35.

According to the configuration described above, the power (first power supply signal) is supplied from the power supply unit 5 to the power supply terminal 62P through the conductive protrusion section 201 provided on the outer peripheral surface 200 of the first pulley 34a and the conductive member 101 of the timing belt 35.

Meanwhile, the printer 1 of the embodiment utilizes the guide rail 36 so as to electrically ground the ground terminal 62G of the head driving circuit 61. Specifically, a conductive portion is provided over substantially an entire length of the guide rail 36 in the longitudinal direction and the conductive portion is grounded by electrically connecting to the mechanical frame 3a of the housing 3. Then, the conductive portion of the guide rail 36 comes into sliding contact with the ground terminal 62G of the head driving circuit 61 through the brush member and the like. Thus, the guide rail 36 and the ground terminal 62G of the head driving circuit 61 are electrically connected to each other, and the discharging path through which the retuning current flows from the head driving circuit 61 is configured.

In addition, even if the foreign matters such as ink mist are attached to the conductive portion of the guide rail 36, in a case where the level of the second power supply signal supplied to the conductive portion is the GND level, safety increases more than otherwise.

As described above, according to the first embodiment of the invention, it is possible to configure the power supply path (supply path of the first power supply signal) to the head driving circuit 61 and the discharging path (supply path of the second power supply signal) and to supply the power from the body portion side to the carriage 32 side without using the FFC. Furthermore, since the timing belt 35 itself that is used for transmission is the member (for example, non-conductive member) having a high electric resistivity, safety is ensured even if the liquid such as the ink is attached.

In addition, in the example described above, the power supply unit 5 is electrically connected to the first pulley 34a that is driven to rotate by the timing belt 35 and the power is supplied to the head driving circuit 61 through the first pulley 34a, but the embodiment is not limited to the aspect, and, of course, the power supply unit 5 is electrically connected to the second pulley 34b that is driven to rotate by the carriage motor 33 and the power may be supplied to the head driving circuit 61 through the second pulley 34b. However, in both cases, it is preferable that the pulley that is not connected to the power supply unit 5 be formed of the non-conductive material.

Furthermore, the power supply path and the discharging path described above may be configured in a manner reversed to each other. That is, the first pulley 34a and the timing belt 35 are used as the discharging path (supply path of the second power supply signal) and the guide rail 36 may be used as the power supply path (supply path of the first power supply signal). In this case, both pulleys of the first pulley 34a and the second pulley 34b may be formed of the conductive material.

Moreover, it is preferable that the timing belt 35, the conductive member 101, the first pulley 34a, and the second pulley 34b be configured of a material having properties of charging in the same polarity. Thus, even if those members are charged due to friction and the like, since the members are charged in the same polarity, the noise according to the ESD is reduced and stability of the potential supplied to the timing belt 35 is improved.

Furthermore, the conductive protrusion section 201 that is the conductive section of the first pulley 34a is formed on the portion protruding to the conductive member 101 (first member) provided in the timing belt 35 and the conductive member 101 (first member) is formed in the cutout section 35c into which the conductive protrusion section 201 that is the conductive section of the first pulley 34a is inserted. Then, the cutout section 35c of the timing belt 35 and the conductive protrusion section 201 of the first pulley 34a inserted into the cutout section 35c are engaged with each other, and the position of the timing belt 35 is regulated. Thus, even if an edge portion 222 is not provided in the outer peripheral surface 200 of the first pulley 34a, since the timing belt 35 is not shifted in the thickness direction of the first pulley 34a, the edge portion 222 may not necessarily be provided in the outer peripheral surface 200 of the first pulley 34a.

In addition, as illustrated in the example in FIG. 5, if necessary, a DC-DC converter 67 is provided and thereby the voltage of the power supply unit 5 may be supplied by transforming to an appropriate voltage (3.3 V in the example illustrated in the drawing) that is required in the head driving circuit 61.

Second Embodiment

Hereinafter, a printer 1 according to a second embodiment of the invention will be described. In order to avoid duplication of description, difference from the printer 1 of the first embodiment will be described and description will be omitted for the points in common with the first embodiment.

Main different points between the first embodiment and the second embodiment are configurations of the first pulley 34a and the timing belt 35 to supply (supply of the first power supply signal) the power from the first pulley 34a side to the timing belt 35 side.

Figure 12:
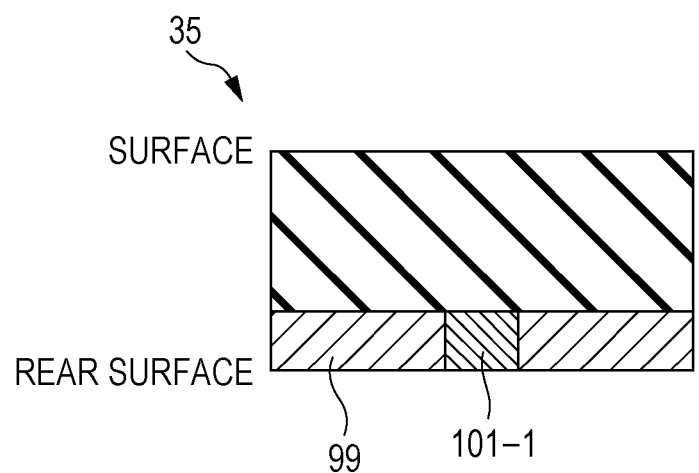
FIG. 12 is a cross-sectional view of the timing belt in a printer according to a second embodiment.
Figure 13:
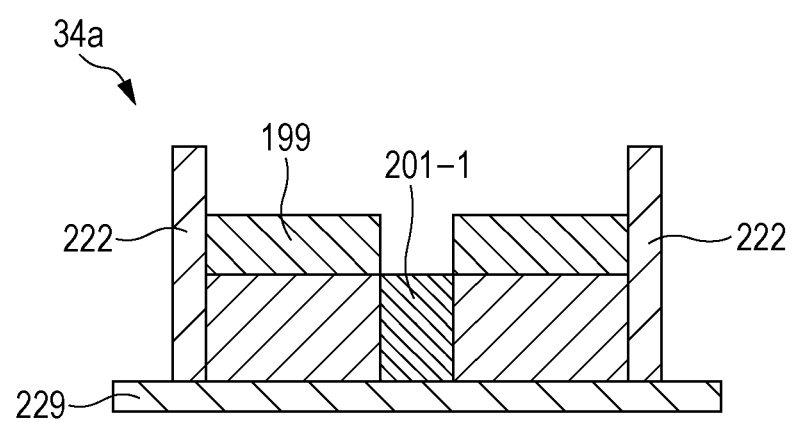
FIG. 13 is a view illustrating a part of a cross section that is obtained by cutting a first pulley in the printer according to the second embodiment in a radial direction.
Figure 14:
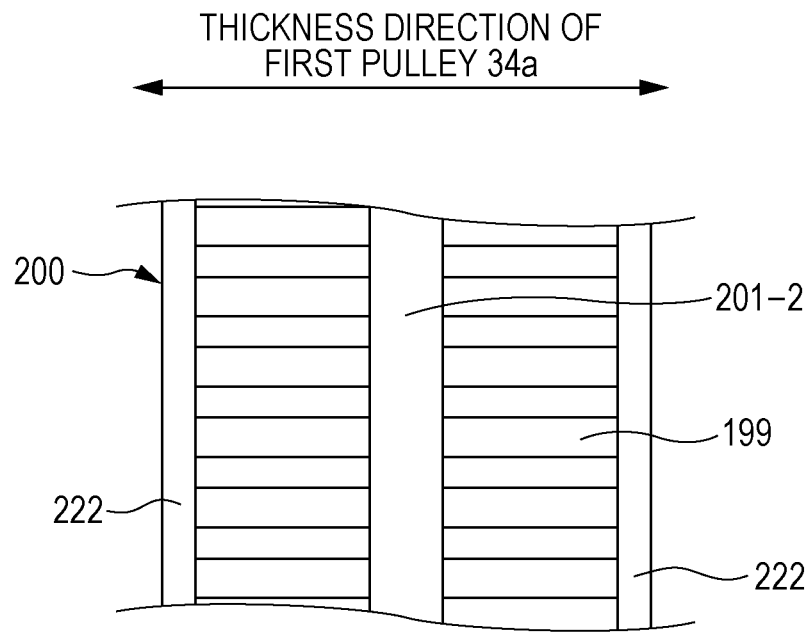
FIG. 14 is a view illustrating an aspect of an outer peripheral surface of the first pulley in the printer according to the second embodiment.

FIG. 12 is a view illustrating a cross section of a timing belt 35 in a printer 1 of the second embodiment, which is taken in a thickness direction. FIG. 13 is a schematic cross-sectional view illustrating a part (one side of a shaft member 229 as a boundary) of a cross section of a first pulley 34a, which is taken along a plane including a central axis of rotation. In other words, FIG. 13 is a view illustrating a part (one side of the shaft member 229 as a boundary) of the cross section of the first pulley 34a, which is taken in a radial direction. FIG. 14 is a view illustrating an aspect of the outer peripheral surface 200 of the first pulley 34a.

In the first embodiment, the supply (supply of the first power supply signal) of the power can be performed by the conductive member 101 coming into contact with the conductive protrusion section 201 by inserting the conductive protrusion section 201 of the first pulley 34a into the cutout section 35c of the timing belt 35.

Meanwhile, in the second embodiment, as illustrated in FIG. 12, a conductive layer 101-1 is provided at a part of a surface coming into contact with the first pulley 34a of the timing belt 35 by vapor deposition of aluminum and as illustrated in FIGS. 13 and 14, at least a portion of an outer peripheral surface 200 of the first pulley 34a, which comes into contact with the conductive layer 101-1, is configured as a conductive section 201-1.

That is, the conductive layer 101-1 functions as a first member to supply the power (first power supply signal), which is output from a power supply unit 5, to a head unit 40 in the timing belt 35. Furthermore, the timing belt 35 itself functions as a second member having an electric resistivity higher than an electric resistivity of the first member (the conductive layer 101-1).

Furthermore, the outer peripheral surface 200 of the first pulley 34a has the conductive section 201-1 to which the power (first power supply signal) is supplied and a tooth-shaped section 199 (power transmission projection section) meshing with a tooth-shaped section 99 (power transmission groove section) of the timing belt 35, which are provided independently of each other.

Here, as illustrated in FIG. 12, the conductive layer 101 is provided individually (in regions different from each other) from the tooth-shaped section 99 and as illustrated in FIG. 13, the conductive section 201-1 is provided individually (in regions different from each other) from the tooth-shaped section 199. Thus, it is possible to reduce influence of noise applied to the power (first power supply signal) supplied from the first pulley 34a side to the timing belt 35 side, in which the noise according to the ESD is generated by friction between the tooth-shaped section 199 of the first pulley 34a and the tooth-shaped section 99 of the timing belt 35. Moreover, it is preferable that the tooth-shaped sections 99 and 199 be insulated from a supply path of a potential from the first pulley 34a side to the timing belt 35 side.

In the second embodiment, according to the configuration described above, it is possible to supply of the power (first power supply signal) from the first pulley 34a side to the timing belt 35 side through the conductive section 201-1 of the first pulley 34a and the conductive layer 101-1 of the timing belt 35.

Moreover, as a method for providing the conductive layer 101-1 to a rear surface (surface coming into contact with the first pulley 34a and the second pulley 34b) of the timing belt 35, for example, the following methods may be provided. That is, a method for providing a non-conductive coating layer on a surface of the timing belt 35 formed of a conductive material, a method for providing a conductive coating layer on a rear surface of the timing belt 35 formed of a non-conductive material, a method for forming the surface of the timing belt 35 in the conductive material and forming the rear surface in the non-conductive material, a method for embedding the conductive member into the timing belt 35 to expose to the rear surface side of the timing belt 35 formed of the non-conductive material, and the like can be provided.

Third Embodiment

Hereinafter, a printer 1 according to a third embodiment of the invention will be described. In order to avoid duplication of description, difference from the printer 1 of the first embodiment will be described and description will be omitted for the common points to the first embodiment.

Figure 15:
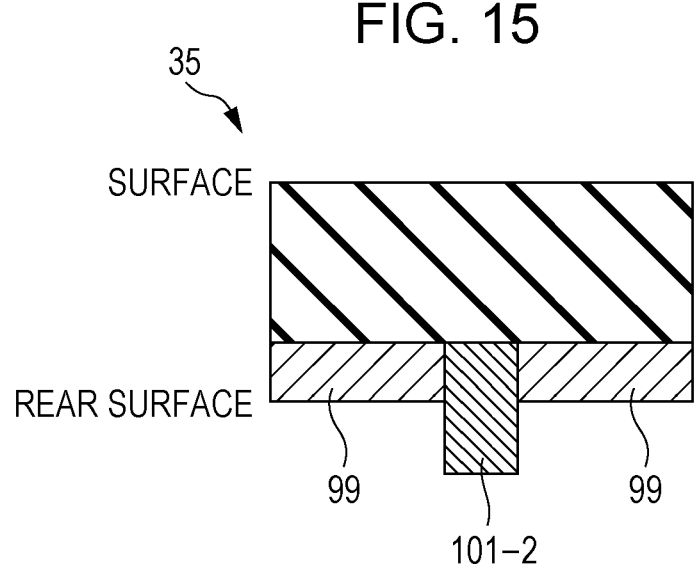
FIG. 15 is a cross-sectional view of a timing belt in a printer according to a third embodiment.
Figure 16:
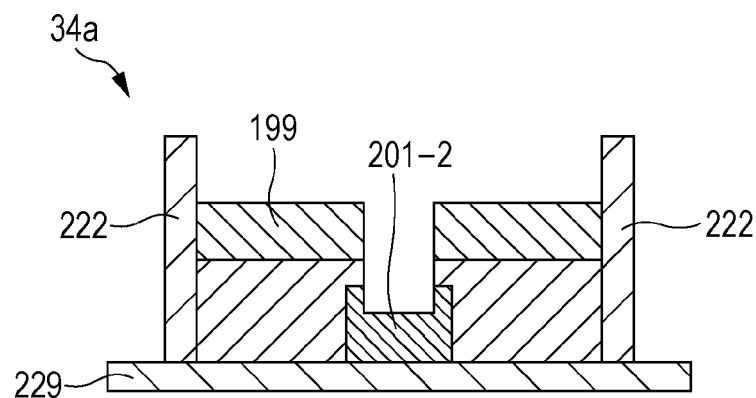
FIG. 16 is a view illustrating a part of a cross section that is obtained by cutting a first pulley in the printer according to the third embodiment in a radial direction.
Figure 17:
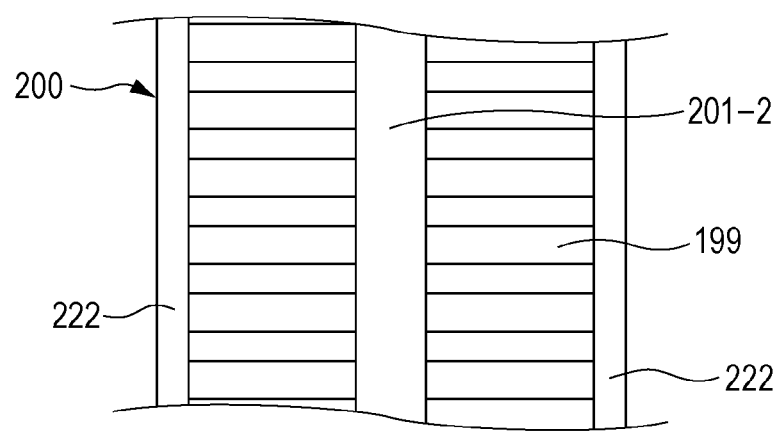
FIG. 17 is a view illustrating an aspect of an outer peripheral surface of the first pulley in the printer according to the third embodiment.

FIG. 15 is a cross-sectional view of a timing belt 35 in the printer 1 of the third embodiment. FIG. 16 is a schematic cross-sectional view illustrating a part (one side of a shaft member 229 as a boundary) of a cross section of a first pulley 34*a*, which is taken along a plane including a central axis of rotation. In other words, FIG. 16 is a view illustrating a part (one side of the shaft member 229 as a boundary) of the cross section of the first pulley 34*a*, which is taken in a radial direction. FIG. 17 is a view illustrating an aspect of an outer peripheral surface 200 of the first pulley 34*a* in the printer 1 according to the third embodiment.

Main different points between the first embodiment and the third embodiment are structures of the first pulley 34*a* and the timing belt 35 to supply (first power supply signal) the power from the first pulley 34*a* side to the timing belt 35 side. In the third embodiment, as illustrated in FIGS. 15 and 16, a conductive projection section (conductive projection section 101-2) is provided on the timing belt 35 side and a conductive groove section (conductive groove section 201-2) is provided on the first pulley 34*a* side.

That is, the conductive projection section 101-2 functions as a first member to supply the power (first power supply signal), which is output from a power supply unit 5, to a head unit 40 in the timing belt 35. Furthermore, the timing belt 35 itself functions as a second member having an electric resistivity higher than an electric resistivity of the first member (the conductive projection section 101-2).

Furthermore, the outer peripheral surface 200 of the first pulley 34*a* has the conductive groove section 201-2 to which the power (first power supply signal) is supplied and a tooth-shaped section 199 (power transmission projection section) meshing with a tooth-shaped section 99 (power transmission groove section) of the timing belt 35, which are provided independently of each other.

Here, the conductive projection section 101-2 that is the first member of the timing belt 35 is formed in a portion protruding to the conductive groove section 201-2 that is the conductive section of the first pulley 34*a*. The conductive groove section 201-2 that is a conductive section of the first pulley 34*a* is formed in a portion engaging with the conductive projection section 101-2 that is the first member of the timing belt 35.

Specifically, the conductive projection section 101-2 and the conductive groove section 201-2 are formed of a conductive material such as metal. Here, it is possible to supply the power (first power supply signal) by coming into contact conductive portions thereof with each other by inserting the conductive projection section 101-2 of the timing belt 35 into the conductive groove section 201-2 of the first pulley 34*a*.

Here, as illustrated in FIG. 15, the conductive projection section 101-2 is provided in a region different from the tooth-shaped section 99 and as illustrated in FIG. 16, the conductive groove section 201-2 is provided in a region different from the tooth-shaped section 199. Thus, it is possible to reduce influence of noise applied to the power (first power supply signal) supplied from the first pulley 34*a* side to the timing belt 35 side, in which the noise according to the ESD is generated by friction between the tooth-shaped section 199 of the first pulley 34*a* and the tooth-shaped section 99 of the timing belt 35.

Moreover, each embodiment described above is intended to facilitate the understanding of the invention and is not intended to be construed as limiting the invention. The invention may be modified or improved without departing from the spirit thereof and, of course, the invention includes equivalents thereof. Particularly, the following embodiments are also included in the invention.

In each embodiment described above, as the method for wirelessly transmitting the control signal such as the printing signal PRT from the controller 10 to the head driving circuit 61 of the carriage 32, the method by the radio waves is used, but the method is not limited to the embodiments as long as the wireless transmission can be performed. For example, the control signal may be optically transmitted. That is, a laser irradiation section is provided on the controller 10 side, a photoelectric conversion section is provided on the carriage 32 side, and the control signal may be transmitted from the laser irradiation section to the photoelectric conversion section as a laser beam. Moreover, in this case, the laser beam of the laser irradiation section is applied parallel to the moving direction of the carriage. Thus, the laser irradiation section can irradiate the photoelectric conversion section with the laser beam over an entire range of the reciprocating path of the carriage 32.

In the embodiments described above, as the ejecting method of the ink, a piezoelectric effect type by the piezoelectric element is exemplified, but the method is not limited to the embodiments. For example, the method may be a thermal jet method in which the ink is heated and the ink is ejected from the nozzles by air bubbles generated in the ink.

What is claimed is:

1. A liquid ejecting apparatus comprising:
a first pulley;
a second pulley;
a head unit ejecting a liquid;
a carriage in which the head unit is provided;
a motor that generates power for driving the carriage;
a power supply that supplies the power for ejecting the liquid from the head unit; and
a belt that is hung on the first pulley and the second pulley, drives the carriage by the power supplied from the motor, and transmits the power to the head unit,
wherein the belt includes
a first member for electrically connecting the power supply and the head unit, and
a second member having an electric resistivity higher than an electric resistivity of the first member,
wherein the power is transmitted to the belt through the first pulley,
wherein a power transmission groove section for transmitting the power from the first pulley is formed on the second member, and
wherein a power transmission projection section for transmitting the power to the power transmission groove section is formed on the first pulley.

2. The liquid ejecting apparatus according to claim 1, wherein an area occupied by the first member of a surface area of the belt is smaller than an area occupied by the second member.

3. The liquid ejecting apparatus according to claim 1, wherein a belt-side engagement section to which the power is transmitted from at least one of the first pulley and the second pulley is formed on the first member, and wherein a pulley-side engagement section for transmitting the power to the belt-side engagement section is formed on at least one of the first pulley and the second pulley.

4. The liquid ejecting apparatus according to claim 1, wherein the first member, the second member, the first pulley, and the second pulley are made of a material having characteristics of charging with the same polarity.

5. A driving method of a liquid ejecting apparatus including
- a first pulley;
- a second pulley;
- a head unit ejecting a liquid;
- a carriage in which the head unit is provided;
- a motor that generates power for driving the carriage;
- a power supply that supplies power for ejecting the liquid from the head unit; and
- a belt that includes a first member for electrically connecting the power supply and the head unit and a second member having an electric resistivity higher than an electric resistivity of the first member, is hung on the first pulley and the second pulley, and drives the carriage by the power supplied from the motor, the method comprising:
- supplying the power to the head unit through the first member; and
- ejecting liquid droplets by the head unit to which the power is supplied,
- wherein the power is transmitted to the belt through the first pulley,
- wherein a power transmission groove section for transmitting the power from the first pulley is formed on the second member, and
- wherein a power transmission projection section for transmitting the power to the power transmission groove section is formed on the first pulley.

* * * * *